United States Patent
Bianco et al.

(10) Patent No.: US 11,059,340 B2
(45) Date of Patent: Jul. 13, 2021

(54) SUSPENSION PROVIDED WITH A LOAD RESPONSIVE DEVICE

(71) Applicant: ARI—AUTOMOTIVE RESEARCH INNOVATION S.A.S. DI FRANCESCA BIANCO & C., Bruino (IT)

(72) Inventors: Francesca Bianco, Moncalieri (IT); Arianna Valente, Moncalieri (IT)

(73) Assignee: ARI—AUTOMOTIVE RESEARCH INNOVATION S.A.S. DI FRANCESCA BIANCO & C., Bruino (IT)

( * ) Notice: Subject to any disclaimer, the term of this patent is extended or adjusted under 35 U.S.C. 154(b) by 3 days.

(21) Appl. No.: 16/632,621

(22) PCT Filed: Jul. 17, 2018

(86) PCT No.: PCT/IB2018/055274
§ 371 (c)(1),
(2) Date: Jan. 21, 2020

(87) PCT Pub. No.: WO2019/016690
PCT Pub. Date: Jan. 24, 2019

(65) Prior Publication Data
US 2020/0198430 A1 Jun. 25, 2020

(30) Foreign Application Priority Data
Jul. 21, 2017 (IT) .................. 102017000083402

(51) Int. Cl.
| | | |
|---|---|---|
| *B60G 21/055* | (2006.01) | |
| *B60G 17/019* | (2006.01) | |
| *B60G 3/06* | (2006.01) | |
| *B60G 7/00* | (2006.01) | |
| *B60G 17/08* | (2006.01) | |

(52) U.S. Cl.
CPC ............. *B60G 17/019* (2013.01); *B60G 3/06* (2013.01); *B60G 7/005* (2013.01); *B60G 7/008* (2013.01);
(Continued)

(58) Field of Classification Search
CPC .......... B60G 7/008; B60G 7/005; B60G 3/06; B60G 17/019; B60G 17/08; B60G 3/04;
(Continued)

(56) References Cited

U.S. PATENT DOCUMENTS

| | | |
|---|---|---|
| 4,913,457 A | 4/1990 | Häfner et al. |
| 5,186,042 A | 2/1993 | Miyazaki |

(Continued)

FOREIGN PATENT DOCUMENTS

| | | | |
|---|---|---|---|
| DE | 2505550 A1 | 8/1976 | |
| DE | 3918359 A1 | 12/1990 | |

(Continued)

OTHER PUBLICATIONS

International Search Report for International Patent Application No. PCT/IB2018/055274, dated Nov. 16, 2018.

*Primary Examiner* — Toan C To
(74) *Attorney, Agent, or Firm* — Cantor Colburn LLP

(57) ABSTRACT

A vehicle suspension comprises a hub carrier on which a wheel hub is suitable for being mounted, a suspension arm having an outer end connected to the hub carrier by a ball joint and an inner end suitable for being attached to a suspended structure of the vehicle, and a shock absorber. At least one load responsive device is arranged on the suspension arm, the load responsive device comprising a sensor able to generate an output signal in response to a load applied to the suspension arm, wherein a control unit is configured to receive the output signal generated by the sensor and to adjust the stiffness of the shock absorber (Continued)

through a valve adapted to vary passage cross-sections of the fluid contained in the shock absorber.

3 Claims, 5 Drawing Sheets

(52) U.S. Cl.
CPC .......... *B60G 17/08* (2013.01); *B60G 2200/14* (2013.01); *B60G 2202/12* (2013.01); *B60G 2202/24* (2013.01); *B60G 2202/312* (2013.01); *B60G 2401/00* (2013.01)

(58) Field of Classification Search
CPC ........ B60G 2204/148; B60G 2202/312; B60G 2202/24; B60G 2200/142; B60G 2202/12; B60G 2204/1162; B60G 2500/112; B60G 2401/00; B60G 2400/64; B60G 2200/01
See application file for complete search history.

(56) References Cited

U.S. PATENT DOCUMENTS

2004/0046380 A1    3/2004  Graber et al.
2008/0193207 A1*   8/2008  Kruse ...................... G01M 3/26
                                                            403/133
2010/0007103 A1*   1/2010  Kim ..................... B60G 21/0555
                                                            280/5.508
2010/0308192 A1*  12/2010  Spratte ................. B60G 17/019
                                                            248/224.8
2013/0147136 A1*   6/2013  Lee ..................... B60G 21/0553
                                                            280/5.508
2016/0332625 A1*  11/2016  Fukudome ............ B60W 30/18
2019/0283733 A1*   9/2019  Takei ................... B60G 17/016

FOREIGN PATENT DOCUMENTS

| EP | 2110273 A1 | 10/2009 |
| FR | 2963072 A1 | 1/2012 |
| JP | S6092906 A | 5/1985 |
| JP | S63269703 A | 11/1988 |
| JP | H03178822 A | 8/1991 |
| JP | 2007230507 A | 9/2007 |
| WO | 2004013592 A2 | 2/2004 |
| WO | 2005021298 A1 | 3/2005 |
| WO | 2007090372 A1 | 8/2007 |
| WO | 2011083335 A2 | 7/2011 |
| WO | 2016078844 A1 | 5/2016 |

\* cited by examiner

SUSPENSION PROVIDED WITH A LOAD RESPONSIVE DEVICE

CROSS-REFERENCE TO RELATED APPLICATIONS

This application is a U.S. National Phase filing of PCT International Patent Application No. PCT/IB2018/055274, having an international filing date of Jul. 17, 2018, which claims priority to Italian Patent Application No. 102017000083402, filed Jul. 21, 2017 each of which is hereby incorporated by reference in its entirety.

FIELD OF THE INVENTION

The present disclosure relates to vehicle suspensions.

As is known, suspensions generally comprise spring elements, shock absorbers and connecting parts consisting of arms, hinges, rods or levers, which make up the structural system that supports and connects the suspended structure of the vehicle to the wheels and transmits the forces at play.

A specific example is the so-called MacPherson suspension, which for simplicity will be referred to hereinafter. In such suspensions the shock absorber is "structural", i.e. it has a rigid connection with the hub carrier. Such constraint eliminates two of the five degrees of freedom of the hub carrier, thus requiring, in the most common solutions, a three-point arm plus a steering rod.

On such a suspension solution, the three-point arm is subjected almost exclusively to radial loads (vehicle axles x and y—horizontal plane XY—see FIG. 1), deriving, for example, from the forces received by the wheels when travelling along a curve or from the loads deriving from braking and accelerations.

On the other hand, axial loads (i.e. directed along the pin—vehicle vertical axis z) are not transmitted to the three-point arm, as the hub carrier and spring-shock absorber system are integrally joined ("structural" shock absorber). The arm is therefore guided in the high-low movement by the wheel without being subjected to direct loads in that direction.

U.S. Pat. No. 4,913,457 A discloses a vehicle suspension comprising a sensor arranged on a suspension arm and configured to generate an output signal in response to a load applied to the suspension arm.

SUMMARY OF THE INVENTION

An object of the present disclosure is to provide a suspension with at least one connecting member configured to produce an output useful for adjusting the behavior of the vehicle.

According to one embodiment, a load responsive device comprises a sensor able to generate an output signal in response to a load applied to the connecting member. From measurement of the loads to which the coupling member is subjected, it may be determined whether the vehicle is accelerating, braking or cornering. For example, in the case of a transversely positioned suspension arm, if the vehicle is in a curve, the force detected on the arm will be directly proportional to the centripetal force, i.e. the higher the speed, the smaller the curvature radius, without the vehicle slipping on the road surface. By inserting a sensor on the suspension arm, the intensity of the centripetal force may be determined moment by moment and, by sending this measurement to the vehicle control unit, the behavior of the vehicle may be modified, for example by acting on the shock absorber of semi-active suspensions or on the actuator of active suspensions in such a way as to improve road grip (by stiffening the shock absorber, the contact force between the tire and the road is more constant with better grip) and obtain more sporting performance. The sensor will control the stiffness of the shock absorber, for example, by varying the damping coefficient of the fluid contained in the shock absorber of the semi-active suspensions or by modifying the dimensions of the passage cross-sections of the fluid contained in the shock absorber.

In the event of detecting the forces acting on the connecting member to assume the approximation of the maximum speed at which the vehicle may take a curve, it may be necessary to use other sensors to determine the friction coefficient of the tires, such as temperature and/or humidity sensors.

Similarly, if a sensor is placed on a connecting member subject to loads deriving from acceleration and braking, it is possible to detect the acceleration and braking of the vehicle and therefore intervene in the behavior of the vehicle on the basis of the signals supplied by the sensor.

According to another embodiment, a load responsive device comprises at least one fluid device able to generate a fluid pressure in response to a load applied to the connecting member. According to a specific embodiment, such pressure controls a valve that modifies the dimensions of the fluid passage cross-sections contained in the shock absorber, thus varying the stiffness of the shock absorber. According to another embodiment, a fluid actuator fluidically connected to the fluid device is adapted to be placed between a hub carrier and a shock absorber, and/or between a hub carrier and a spring element, to move the shock absorber and/or the spring element along an adjustment axis in response to the fluid pressure generated by the fluid device.

A pressure multiplier fluidically connected between the fluid device and the fluid actuator may also be provided.

When the vehicle is cornering, the fluid device compresses, sending the fluid contained therein to the adjustment valve of the fluid passage cross-section of the shock absorber. Moreover, the fluid may also be sent to a pressure multiplier, which in turn will send it to the fluid actuator located between the hub carrier and the shock absorber and/or the spring element.

In this way, the more the connecting member is compressed due to centripetal force, the higher the base of the spring/shock absorber is raised, straightening the body of the vehicle and/or stiffening the shock absorber.

According to alternative embodiments, the fluid actuator located between the hub carrier and the shock absorber and/or the spring element is controlled by a sensor, located on a connecting member, able to generate an output signal in response to a load applied to the connecting member.

Similarly, if a fluid device is placed on a connecting member subject to loads deriving from acceleration and braking, it is possible to make the system responsive to the braking and acceleration of the vehicle and to intervene in the behavior of the vehicle on the basis of output signals supplied by the load responsive device.

Further features and advantages of the invention will become apparent from the detailed description that follows, provided by way of non-limiting example with reference to the drawings.

DETAILED DESCRIPTION

Figure 1:
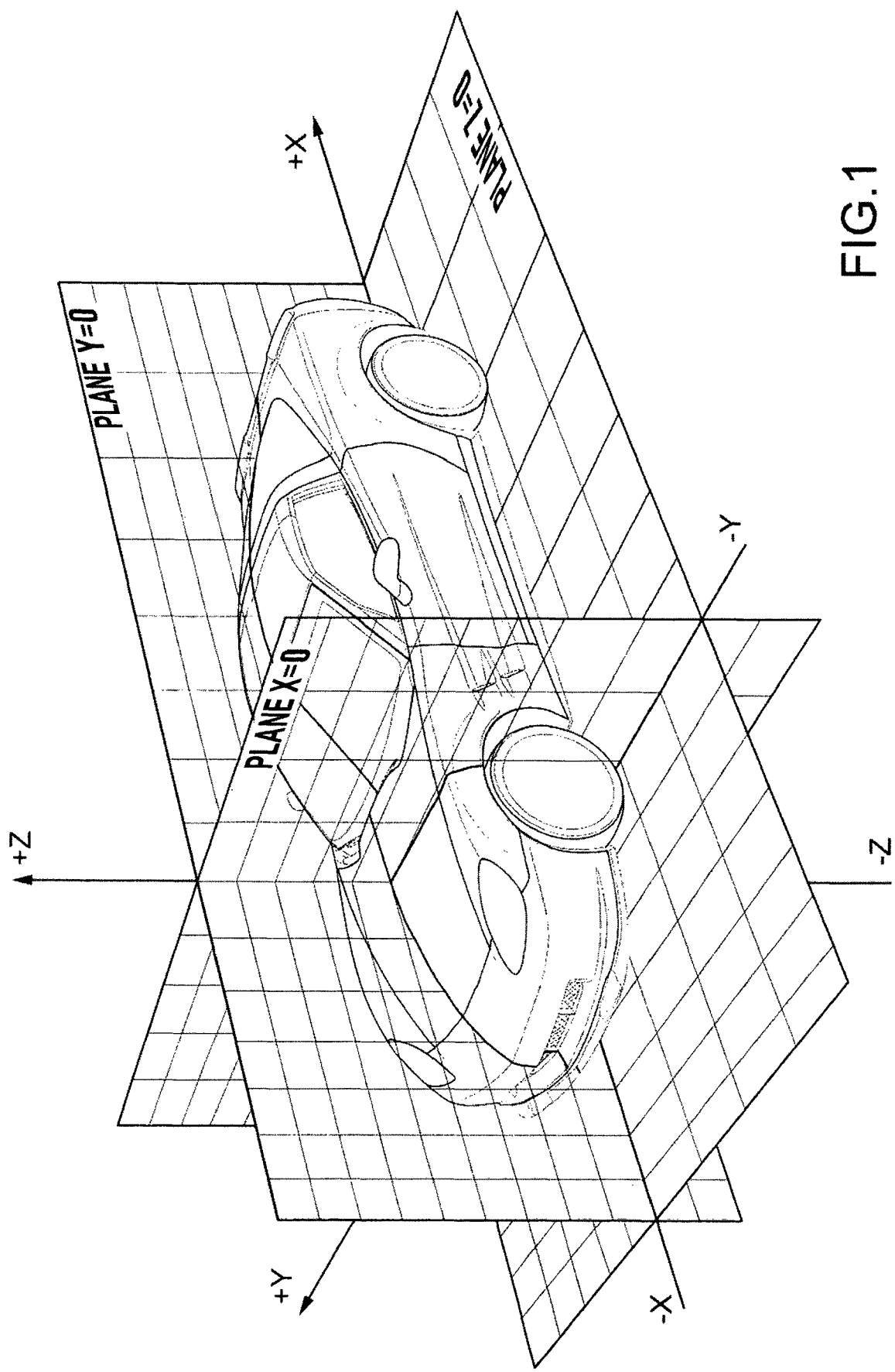
FIG. 1 is a representation of a vehicle in a Cartesian coordinate system.
Figure 2:
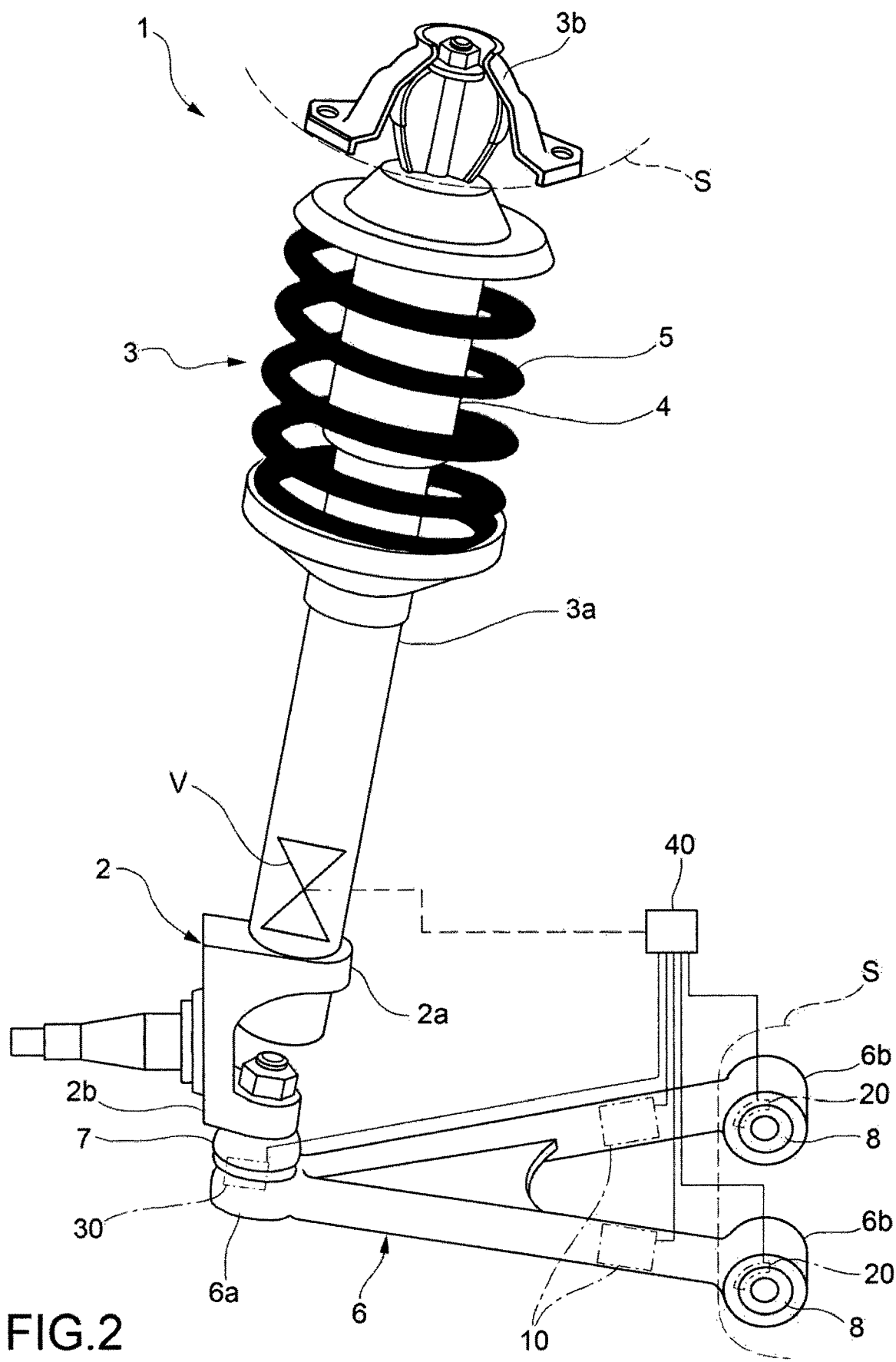
FIG. 2 schematically represents a first embodiment of a suspension according to the present disclosure.
Figure 3:
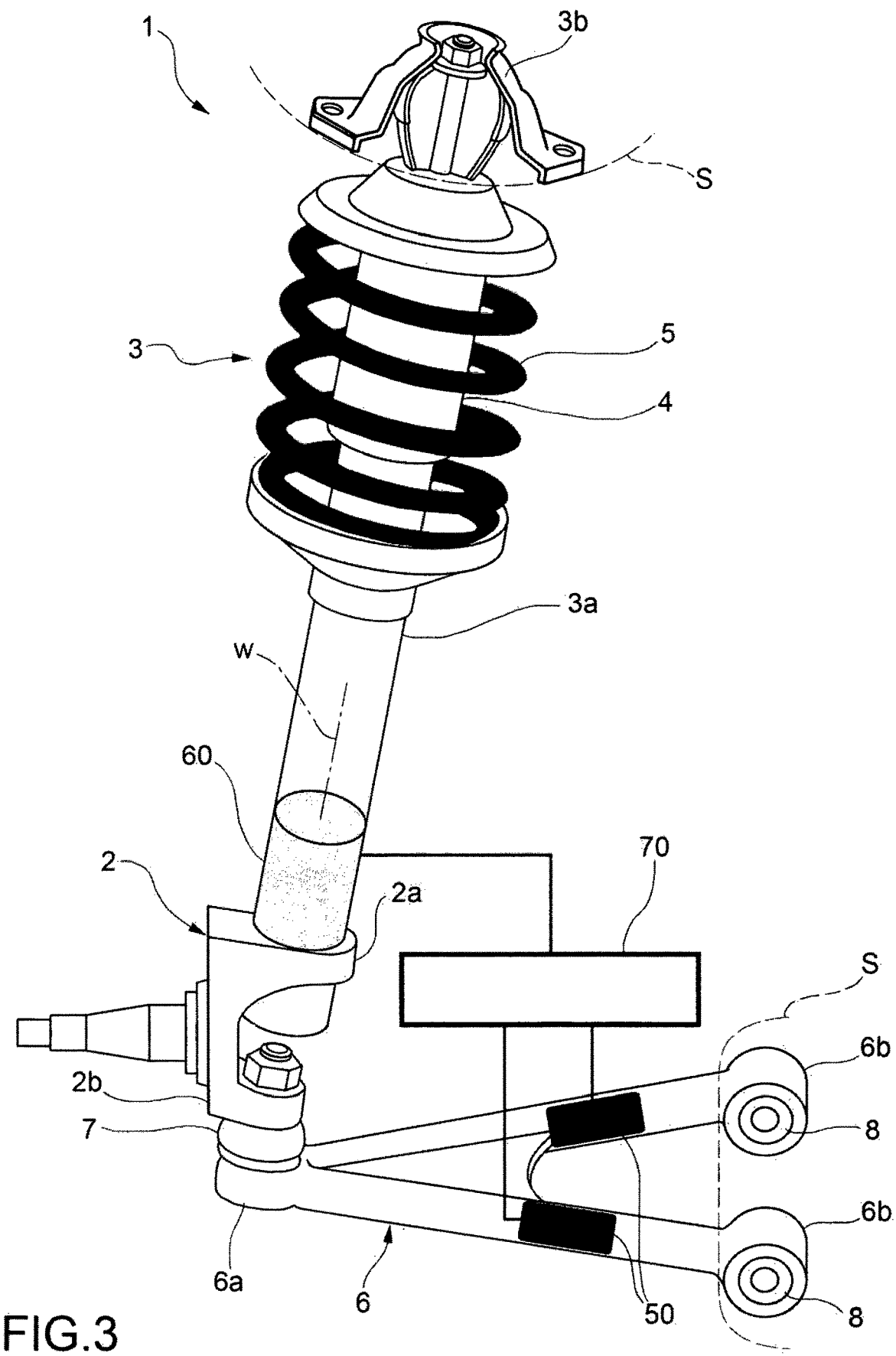
FIG. 3 schematically represents an embodiment of a suspension not according to the present disclosure.
Figure 4:
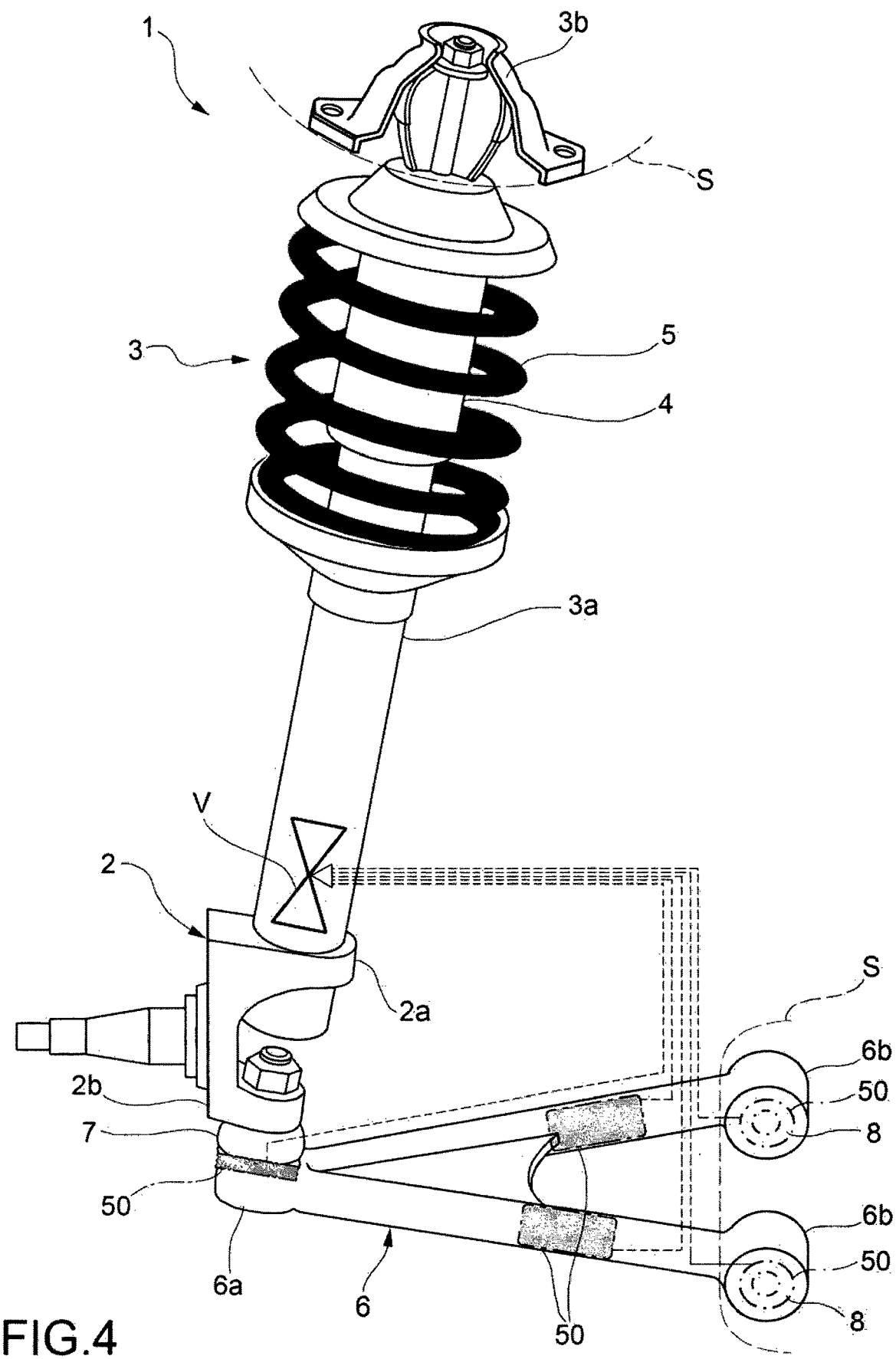
FIG. 4 schematically represents a second embodiment of a suspension according to the present disclosure.

In FIGS. 2, 3 and 4, a MacPherson-type suspension is shown, indicated collectively at 1.

It is understood, however, that the present disclosure is not limited to such type of suspension but applies in general to any type of suspension for a vehicle wherein, on a connecting member between the suspended structure of the vehicle and the wheel, a load may be detected in the event of acceleration, braking or steering.

For the purposes of the present disclosure, "connecting member" means any member, including an arm, a hinge, a rod, a lever, and a hub carrier, which connects the suspended structure of the vehicle to the wheel hub and transmits the forces at play.

The suspension 1 shown in FIG. 2 comprises a hub carrier 2, on which may be mounted the hub of a wheel (not shown), comprising an upper end 2a and a lower end 2b.

The suspension 1 further comprises a spring-shock absorber unit 3 comprising a shock absorber 4 and a spring 5. The spring-shock absorber unit 3 has a lower end 3a rigidly connected to the upper end 2a of the hub carrier 2 and an upper end 3b adapted to be connected to a suspended structure S of the vehicle.

The suspension 1 further comprises a three-point suspension arm 6 having a fork shape, arranged transversely to the longitudinal (and running) direction of the vehicle. The suspension arm 6 has an outer end 6a connected by a spherical hinge to the lower end 2b of the hub carrier 2 and to two internal ends 6b (corresponding to the two branches of the suspension arm) suitable to be connected by a hinge to the suspended structure S of the vehicle. In FIG. 2, reference numeral 7 indicates a ball joint placed in a seat obtained at the external end 6a of the suspension arm, and reference numeral 8 indicates silent-block bushings arranged in respective seats made in the inner ends 6b of the suspension arm.

At least one load responsive device is located on the suspension arm 6 and/or on the hinge of the outer end of the suspension arm and/or on the hinges of the inner ends of the suspension arm and/or on the hub carrier. Such load responsive device is able to generate an output signal in response to a load applied to the suspension arm 6.

In the embodiment of FIG. 2, the load responsive device is configured as a sensor able to generate an output signal in response to a load applied to the suspension arm 6. In particular, FIG. 2 illustrates two sensors 10 positioned on the respective branches of the suspension arm 6, two sensors 20 positioned between the respective silent-block bushings 8 and the respective seats that house the silent-block bushings, and one sensor 30 positioned between the ball joint 7 and the seat that houses the ball joint 7, obtained at the outer end 6a of the suspension arm 6.

The sensors 10, 20 and 30 also allow to detect individually the loads to which the suspension arm 6 is subjected when the vehicle is cornering, accelerating or braking. When properly positioned, the sensors also allow differentiation between loads due to acceleration and loads due to braking.

The sensors 10, 20, 30 may be strain sensors, pressure sensors or displacement sensors or any other type of sensor adapted to detect the loads to which the arm is subjected.

The sensors 10, 20, 30 are operatively connected to a control unit 40 configured to receive the output signal generated by the sensors 10, 20, 30 and to adjust the motion of the vehicle based on such output signal.

Alternatively or in combination, the control unit 40 may be configured to adjust the viscous damping coefficient of the shock absorber 4, or to control a valve V to adjust the fluid passage cross-sections contained in the shock absorber, based on the output signal of the sensors 10, 20, 30.

Alternatively or in combination, the control unit 40 may be configured to control a fluid roll control cylinder (not shown) located between the hub carrier and the shock absorber and/or spring member, or to control an active suspension actuator (not shown) based on the output signal.

The output signals from sensors 10, 20, 30 may be combined with those from other sensors placed on the vehicle to achieve greater accuracy. For example, a useful sensor could be a thermometer and/or a hygrometer, to estimate the tire friction coefficient.

FIG. 3 illustrates an embodiment not according to the present invention. The same reference numbers have been assigned to elements corresponding to those of the preceding embodiment. Such elements will not be described further.

In the embodiment of FIG. 3, the load responsive device is configured as a fluid cylinder 50 (in the example, two cylinders positioned on the branches of the suspension arm 6) able to generate a fluid pressure (e.g. by compression of cylinders) in response to a load applied to the suspension arm 6. A roll control actuator or cylinder 60, fluidically connected to the fluid cylinder 50, is arranged between the hub carrier 2 and the spring-shock absorber unit 3 to adjust the height of the spring-shock absorber unit 3 in response to the fluid pressure generated by the fluid cylinder 50. A pressure multiplier 70 may be installed between the fluid cylinder 50 and the roll control cylinder 60.

According to alternative embodiments (not shown), in place of the spring-shock absorber unit, only a spring, or only a shock absorber, may be used.

According to alternative embodiments (not shown), instead of the fluid cylinder, another type of fluid device may be positioned in the area of the joint or the silent-block bushings or in any area of the connecting members, which may have any configuration (for example a membrane or a deformable wall) so as to generate a fluid outlet/inlet following a load applied to the connecting member itself.

When the vehicle is cornering, the fluid cylinders 50 compress, sending the fluid contained therein to the pressure multiplier 70 which in turn sends it into the roll control cylinder 60 placed between the hub carrier 2 and the spring-shock absorber unit. 3.

A flow measurement sensor (not shown) may be positioned between the cylinder 50 and the cylinder 60. Such flow measurement sensor is operatively connected to a control unit (not shown) configured to receive the output signal generated by the sensor and to adjust the motion of the vehicle on the basis of such output signal, with the possible aid of a temperature and/or humidity sensor.

Alternatively or in combination, the control unit may be configured to adjust the viscous damping coefficient of the shock absorber 4, and/or to control an active suspension actuator (not shown), based on the output signal of the flow measurement sensor.

The control implemented by the system described above may be combined with the control implemented by sensors located on the vehicle.

According to a further embodiment (not shown), a roll control cylinder connected to a fluid reservoir may be provided between the hub carrier and the spring-shock absorber unit, the spring or the shock absorber. Such cylinder may be controlled by a control unit on the basis of signals supplied by sensors arranged on one or more connecting members of the suspension.

FIG. 4 illustrates a second embodiment of the present disclosure. The same reference numbers have been assigned to elements corresponding to those of the preceding embodiments. Such elements will not be further described.

In the embodiment of FIG. 4, the load responsive device is configured as a fluid cylinder 50 (in the example, two cylinders positioned on the branches of the suspension arm 6, or alternatively a fluid device 50 located in the joint area, or alternatively a fluid device 50 located in the area of the silent-block bushings) able to generate a fluid pressure (e.g. by compressing the cylinders) in response to a load applied to the suspension arm 6. The shock absorber may vary its stiffness as the size of the fluid passage cross-sections contained therein varies, through an adjustment valve V. Such valve is in turn controlled by the pressure of the fluid of the load responsive device 50.

According to alternative embodiments (not shown), instead of the fluid cylinder, another type of fluid device may be positioned in the area of the connecting members, which may have any configuration (for example a membrane or a deformable wall) so as to generate a fluid outlet/inlet following a load applied to the connecting member.

Figure 5:
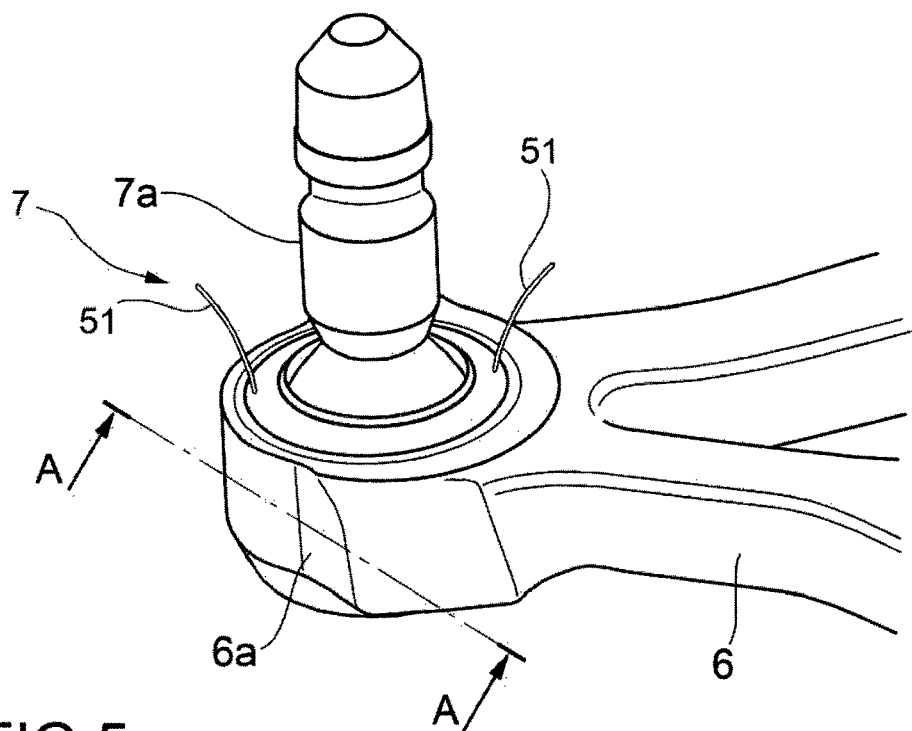
FIG. 5 represents a prospective view of a detail of the suspension in FIG. 4.
Figure 6:
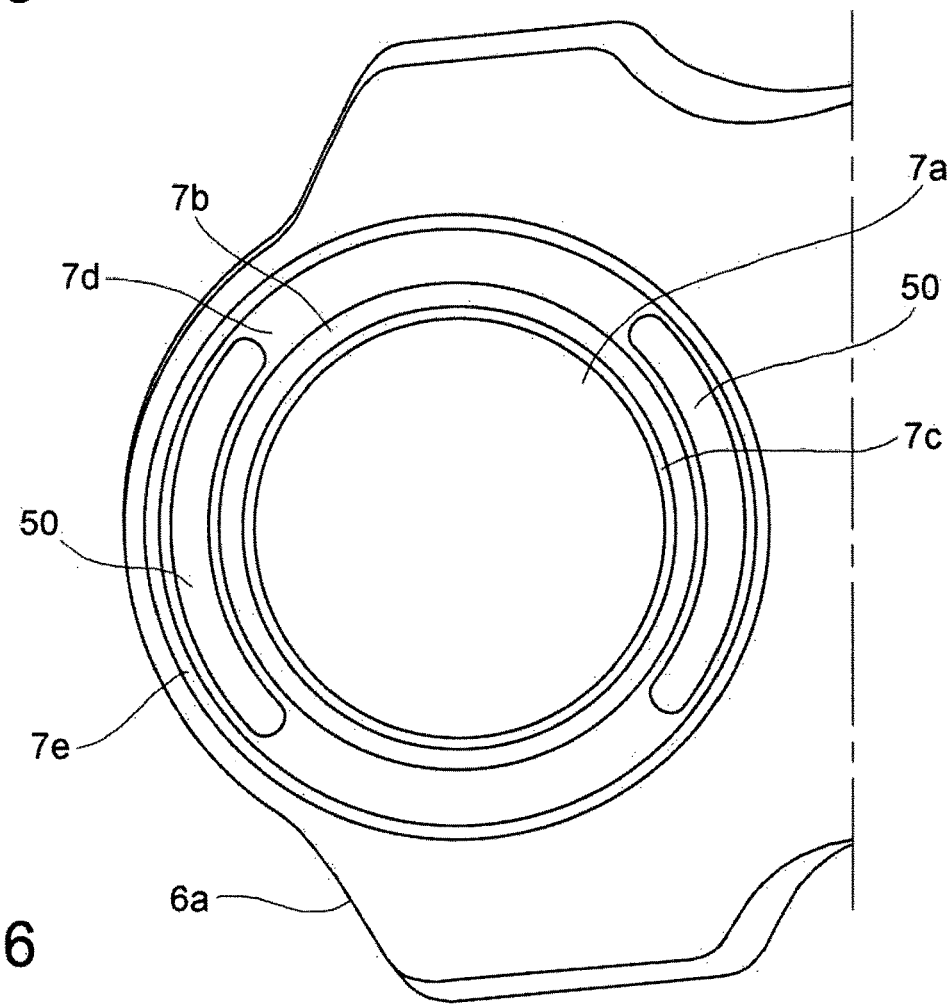
FIG. 6 is a cross-sectional view taken along the line A-A of FIG. 5.

With reference to FIGS. 5 and 6, a fluid device 50 is arranged at the ball joint 7. The ball joint conventionally comprises a ball shank 7a for connecting to the hub carrier 2, a ball joint body 7b and a plastic bearing 7c interposed between the ball shank 7a and the ball joint body 7b. The ball joint further comprises a support 7d of elastomeric material provided with an armature 7e made of metallic material, through which the body 7b of the ball joint is connected to the end 6a of the suspension arm 6. In the illustrated example, the fluid device 50 is made as a pair of chambers in the support 7d made of elastomeric material and filled with fluid. The chambers of the fluid device 50 are fluidically connected to the adjustment valve V by small connection tubes 51.

When the vehicle is cornering, the fluid devices 50 compress, sending the fluid contained therein to the adjustment valve V that adjusts the stiffness of the shock absorber.

A flow measurement sensor (not shown) may be positioned between the cylinder 50 and the adjustment valve of the shock absorber. The flow measurement sensor is operatively connected to a control unit (not shown) configured to receive the output signal generated by the sensor and to adjust the motion of the vehicle on the basis of such output signal, with the possible aid of a temperature and/or humidity sensor.

Alternatively or in combination therewith, the control unit (not shown) may be configured to adjust the viscous damping coefficient of the shock absorber 4, and/or to control an active suspension actuator (not shown), based on the output signal of the flow measurement sensor.

The control carried out by the system described above may be combined with the one carried out by sensors located on the vehicle.

The invention claimed is:

1. A vehicle suspension, comprising a hub carrier, on which a wheel hub is suitable for being mounted, a suspension arm having an outer end connected to the hub carrier by a ball joint and an inner end suitable for being attached to a suspended structure of a vehicle, and a shock absorber,
   wherein at least one load responsive device is arranged on the suspension arm, said load responsive device comprising a sensor generating an output signal in response to a load applied to the suspension arm,
   wherein a control unit is configured to receive the output signal generated by the sensor and to adjust stiffness of the shock absorber through a valve adapted to vary passage cross-sections of fluid contained in the shock absorber, and wherein
   said load responsive device is arranged between the ball joint and a seat that houses the ball joint on the outer end of the suspension arm.

2. The vehicle suspension of claim 1, wherein the control unit is configured to adjust motion of the vehicle based on said output signal.

3. A vehicle suspension, comprising a hub carrier configured to have a wheel hub mounted thereon, a suspension arm having an outer end connected to the hub carrier by a ball joint and an inner end adapted to be attached to a suspended structure of a vehicle, a shock absorber, and a valve adapted to vary fluid-passage cross-sections through the shock absorber to change stiffness of the shock absorber,
   said vehicle suspension further comprising at least one load responsive device fitted at the ball joint, said load responsive device comprising a fluid device fluidically connected to the valve and able to generate a fluid pressure in response to a load applied to the ball joint.

* * * * *